United States Patent
Goering et al.

(10) Patent No.: US 10,232,890 B1
(45) Date of Patent: Mar. 19, 2019

(54) CONTROL MECHANISM FOR BOTTOM SHIELD OF COTTON HARVESTER

(71) Applicant: Deere & Company, Moline, IL (US)

(72) Inventors: Kevin J. Goering, Cambridge, IA (US); Michael J. Myers, Ankeny, IA (US)

(73) Assignee: DEERE & COMPANY, Moline, IL (US)

( * ) Notice: Subject to any disclaimer, the term of this patent is extended or adjusted under 35 U.S.C. 154(b) by 0 days.

(21) Appl. No.: 15/705,444

(22) Filed: Sep. 15, 2017

(51) Int. Cl.
| | |
|---|---|
| *B62D 25/20* | (2006.01) |
| *E05F 17/00* | (2006.01) |
| *E05F 11/54* | (2006.01) |
| *E05F 15/60* | (2015.01) |
| *E05F 15/53* | (2015.01) |
| *A01D 46/08* | (2006.01) |

(52) U.S. Cl.
CPC ............. *B62D 25/20* (2013.01); *E05F 11/54* (2013.01); *E05F 15/53* (2015.01); *E05F 15/60* (2015.01); *E05F 17/004* (2013.01); *A01D 46/08* (2013.01); *E05F 2017/008* (2013.01); *E05Y 2900/518* (2013.01)

(58) Field of Classification Search
CPC ........... B60P 1/56; F41H 7/042; B62D 21/155
See application file for complete search history.

(56) References Cited

U.S. PATENT DOCUMENTS

| | | | | | |
|---|---|---|---|---|---|
| 2,616,353 | A | * | 11/1952 | Thomann | A01D 46/10 180/21 |
| 3,266,679 | A | * | 8/1966 | Arbel | B61D 7/26 105/241.2 |
| 3,809,167 | A | * | 5/1974 | Glider | E02F 3/7609 172/811 |
| 4,664,446 | A | * | 5/1987 | Word | B60P 1/56 298/29 |
| 5,181,373 | A | * | 1/1993 | Littau | A01D 46/28 56/329 |
| 5,284,349 | A | * | 2/1994 | Bruns | B60R 3/02 182/91 |
| 5,405,292 | A | * | 4/1995 | McConnell | A01D 75/18 460/119 |

(Continued)

*Primary Examiner* — James A Shriver, II
*Assistant Examiner* — James J Triggs
(74) *Attorney, Agent, or Firm* — Taft Stettinius & Hollister LLP; Stephen F. Rost

(57) ABSTRACT

A plant shield assembly includes an elongated shield having a first door operably connected to a second door and both doors are pivotally connected to the vehicle and movable between an open position and a closed position. The plant shield assembly includes a door opening mechanism operably attached to the elongated shield and configured to move the first and the second doors. The plant shield assembly includes a linkage assembly that connects the elongated shield with the door opening mechanism, and limits the extent of rotation of the doors. The door opening mechanism and linkage assembly are positioned between the elongated shield and the vehicle. The door opening mechanism can be a handle attached to the elongated shield. Optionally, the plant shield assembly includes an access door that is disposed between an open position to enable actuation of the handle and a closed position to block actuation of the handle.

17 Claims, 14 Drawing Sheets

(56) References Cited

U.S. PATENT DOCUMENTS

| | | | | |
|---|---|---|---|---|
| 5,839,531 | A * | 11/1998 | McGee | F01M 11/0408 |
| | | | | 180/69.1 |
| 6,622,849 | B1 * | 9/2003 | Sperling | B65D 90/623 |
| | | | | 198/532 |
| 8,028,781 | B2 * | 10/2011 | Fausch | A01D 75/18 |
| | | | | 180/69.1 |
| 8,256,354 | B2 * | 9/2012 | Aaron | B60P 1/165 |
| | | | | 105/239 |
| 2009/0249757 | A1 * | 10/2009 | Diederich, Jr. | A01D 41/14 |
| | | | | 56/6 |
| 2009/0280876 | A1 | 11/2009 | Yoder et al. | |

* cited by examiner

CONTROL MECHANISM FOR BOTTOM SHIELD OF COTTON HARVESTER

FIELD OF THE DISCLOSURE

The present disclosure relates to a belly shield for a cotton harvester, and in particular, to a control mechanism for the belly shield.

BACKGROUND OF THE DISCLOSURE

Cotton harvesters often have smooth sheet metal shields across the bottom of their chassis that are commonly referred to as belly shields. These belly shields close off the engine compartment to keep burrs, green bolls, sticks and other debris out. The belly shields also provide a smooth surface to minimize the chance of knocking green bolls off the plants in case the operator decides to do a second pick later to harvest those bolls. These shields are typically held in place by some type of latch. Typically, the latch is a spring pin type or a quarter turn fastener. Alternatively, the sheet metal shields are attached to the chassis with bolts.

Regardless of which type of latch is used, these latches can get filled with dust and debris and become difficult to operate. It is typical that the operator would need to crawl under the machine in order to open the belly shields. Dust and leaf trash can accumulate on top of the shield and can fall down onto the operator when they open the shield. Therefore, some operators may choose to avoid opening belly shields to avoid getting dust and leaf trash on themselves, however accumulated dust and debris can be a potential fire hazard or safety concern. Moreover, built up dust and debris in the machine can lead to poor performance of the machine.

Some latches can protrude down from the underside of the machine and have the potential to knock green bolls off the plants and thereby decreases the number of bolls that can be collected on a subsequent harvest of cotton plants. Other latches have knobs that cover the latches however these knobs can be knocked off by the cotton stalks and the latches can be damaged by the cotton stalks. In some situations, the crop material may accidentally release the latch and allow the belly shield to open during operation which may result in loss or damage to the belly shield and/or the crops. Other times the latches become defective and allow the shields to partially open and become distorted through use of the harvestor.

Thus there is a need for improvement for belly shields.

SUMMARY

According to one embodiment, there is provided a plant shield assembly for a vehicle. The plant shield assembly includes an elongated shield having a first door operably connected to a second door, the first and the second doors pivotally connected to the vehicle and movable between an open position and a closed position. The plant shield assembly includes a door opening mechanism operably attached to the elongated shield and configured to move the first and the second doors between the open and closed positions wherein the door opening mechanism located between the elongated shield and the vehicle. The plant shield assembly also includes a linkage assembly that connects the elongated shield with the door opening mechanism, the linkage assembly is configured to limit and control the extent of rotation of the first and second doors and the linkage assembly is positioned between the elongated shield and the vehicle.

In a further embodiment, the linkage assembly includes an over center latch mechanism having a first link set operably connected with the first door and a second link set operably connected with the second door wherein the first link set is configured to rotate in a first direction to open the first door and the second link set is configured to rotate in a second direction to open the second door, wherein the first direction is opposite of the second direction.

In another embodiment, the door opening mechanism includes one of a hydraulic cylinder, an air cylinder, or an electric actuator.

In a further embodiment, the linkage assembly includes an over center latch mechanism having a first link set operably connected with the first door and a second link set operably connected with the second door, the first link set configured to rotate in a first direction to open the first door, the second link set configured to rotate in a second direction to open the second door, wherein the first direction is the same as the second direction.

In any embodiment, the plant shield assembly also includes an access door adjacent the door opening mechanism wherein the access door is configured to be disposed between an open position to enable actuation of the door opening mechanism and a closed position to block actuation of the door opening mechanism.

In any embodiment, the plant shield assembly also includes a first adjustable turnbuckle operably attached between the door opening mechanism and the first door, the first adjustable turnbuckle is configured to adjust a position of the first door relative to the second door. In any embodiments, the elongated shield can include a third door operably connected to a fourth door, the third and the fourth doors pivotally connected to the vehicle and operable between an open position and a closed position, the first and the second doors are operably connected to the third and fourth doors such that all of the doors are actuated together.

In any embodiment, the plant shield assembly also includes a frame attached to the vehicle, the frame having a pair of longitudinal members connected to a pair of transverse members wherein the elongated shield is attached to the frame. In this form, optionally the first door is pivotally attached to one of the longitudinal members and the second door is pivotally attached to the other of the longitudinal members such that the first door and the second door rotate away from each other. Alternatively, the first door and the second door are pivotally attached to one of the longitudinal members such that the first and the second door pivot towards the one longitudinal member.

According to another embodiment, there is provided a plant shield assembly for a vehicle that includes an elongated shield having one or more doors pivotally connected to the vehicle and operable between an open position and a closed position, a handle operably attached to the elongated shield and configured to operate the one or more doors between the open position and the closed position, and an access door adjacent the handle wherein the access door is configured to be disposed between an open position to enable actuation of the handle and a closed position to block actuation of the handle.

In one further embodiment, the access door is configured to rotate away from the vehicle to enable operation of the handle. In another embodiment, the access door is configured to cover the handle in the closed position. In any form, the handle is configured for rotation and has a path of rotation that is substantially perpendicular with the closed position of the access door. In any form, the handle is located between the elongated shield and the vehicle.

In any embodiment, a first door of the one or more doors includes a first end portion and a second door of the one or more doors includes a second end portion, wherein the first end portion and the second end portion are configured to have an overlapping arrangement when the first and the second doors are in the closed position.

In any form, the plant shield assembly also includes a linkage assembly operatively connecting the elongated shield with the handle, the linkage assembly configured to limit and control the extent of rotation of the one or more doors, the linkage assembly positioned between the elongated shield and the vehicle.

In any embodiment, a method of operating a plant shield assembly for a vehicle includes providing an elongated shield having one or more doors, the one or more doors hingedly connected to the vehicle, moving an access door from a closed position that blocks operation of a door opening mechanism to an open position that enables operation of the door opening mechanism, and after the access door is in the open position, operating the door opening mechanism positioned between the access door and the vehicle to rotate the one or more doors from a closed position to an open position.

In any embodiment, the method can also include operating the door opening mechanism includes rotating a handle of the door opening mechanism. In a further embodiment, the method can also include adjusting an adjustable turnbuckle operably attached between the door opening mechanism and one of the doors to adjust a position of one of the doors relative to a second one of the doors.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

Corresponding reference numerals are used to indicate corresponding parts throughout the several views.

DETAILED DESCRIPTION

The embodiments of the present disclosure described below are not intended to be exhaustive or to limit the disclosure to the precise forms in the following detailed description. Rather, the embodiments are chosen and described so that others skilled in the art may appreciate and understand the principles and practices of the present disclosure.

Figure 1:
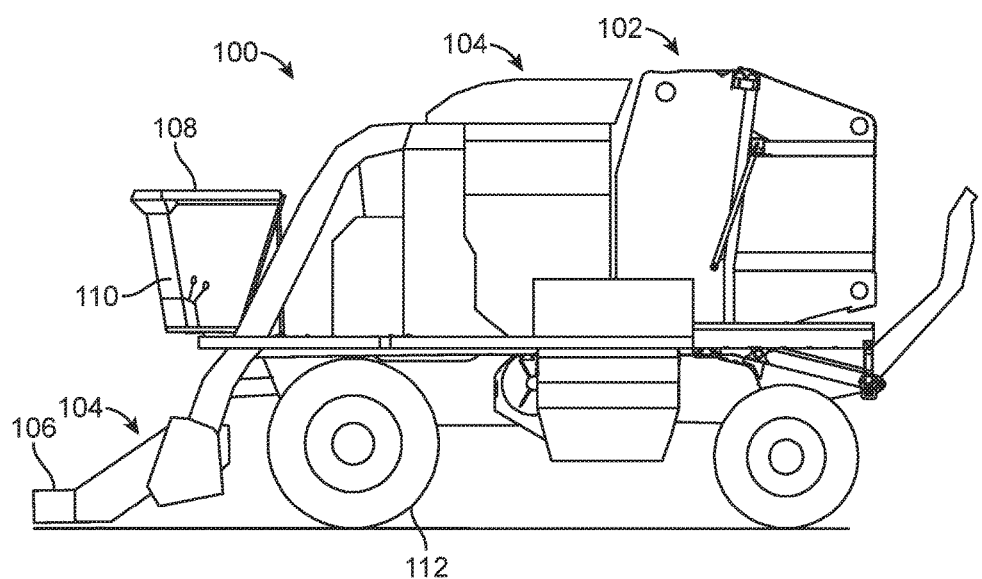
FIG. 1 is an elevated perspective view of a cotton harvester.

Referring to FIG. 1, a cotton harvester 100 is shown. The cotton harvester 100 may have a work machine 102 coupled to a header unit 104. The work machine 102 may have a plurality of ground engaging mechanisms 112 such as wheels or tracks. Further, the header unit 104 may have a plurality of row units 106 positioned thereon. There may be other types of implements instead of row units 106 and this disclosure is not limited to the precise type of implement shown.

The work machine 102 may also have a cab 108 coupled thereto. The cab 108 may be a location for a user to access controls 110 of the cotton harvester 100 and thereby direct the harvesting process. The controls 110 may include inputs to manipulate the direction and speed of the cotton harvester, inputs to operate a plant shield assembly 200, inputs to initiate a harvesting sequence on the header unit 104, and inputs to raise and lower the header unit 104 among others.

Figure 2:
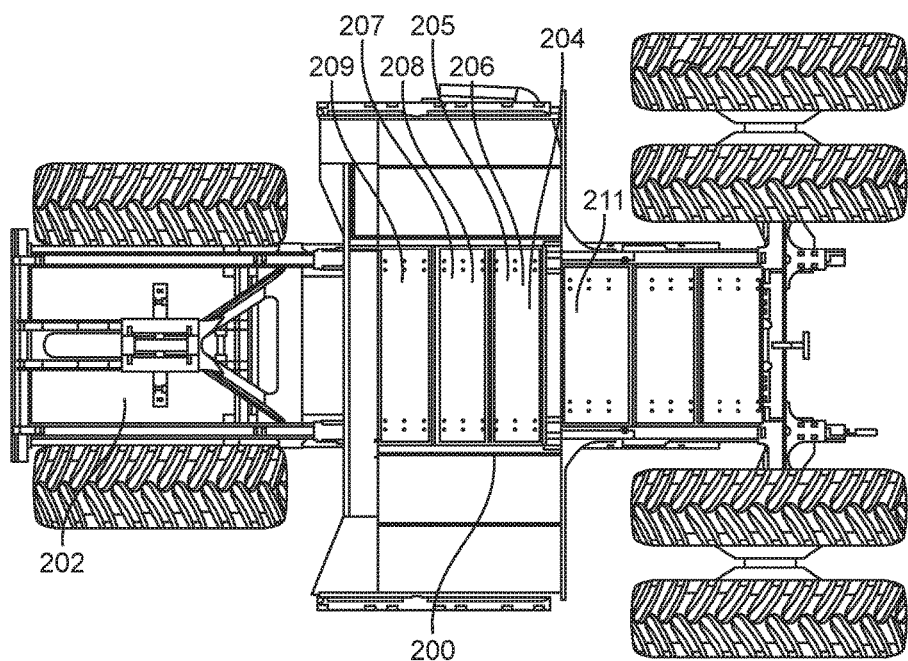
FIG. 2 is a bottom view of the cotton harvester with one embodiment of a plant shield assembly attached thereto.

In one embodiment, illustrated in FIG. 2, is a plant shield assembly 200 attached to an underside 202 of the cotton harvester 100. Although a single plant shield assembly 200 is described, additional or multiple plant shield assemblies can be attached to the underside 202 of the cotton harvester 100 to fully or partially cover and enclose the underside 202 of the cotton harvester 100.

Figure 3:
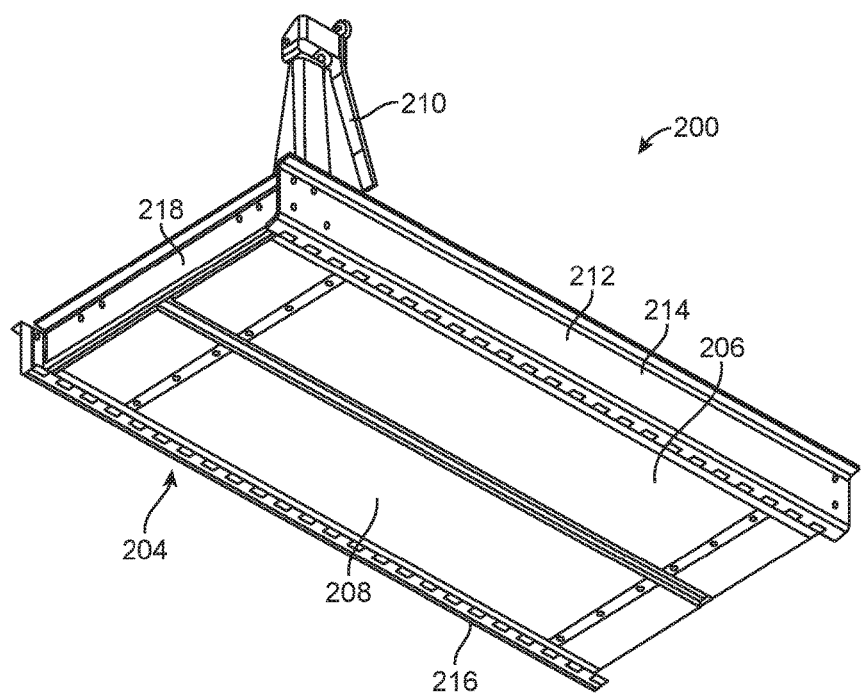
FIG. 3 is a bottom perspective view of the plant shield assembly of FIG. 2.
Figure 4:
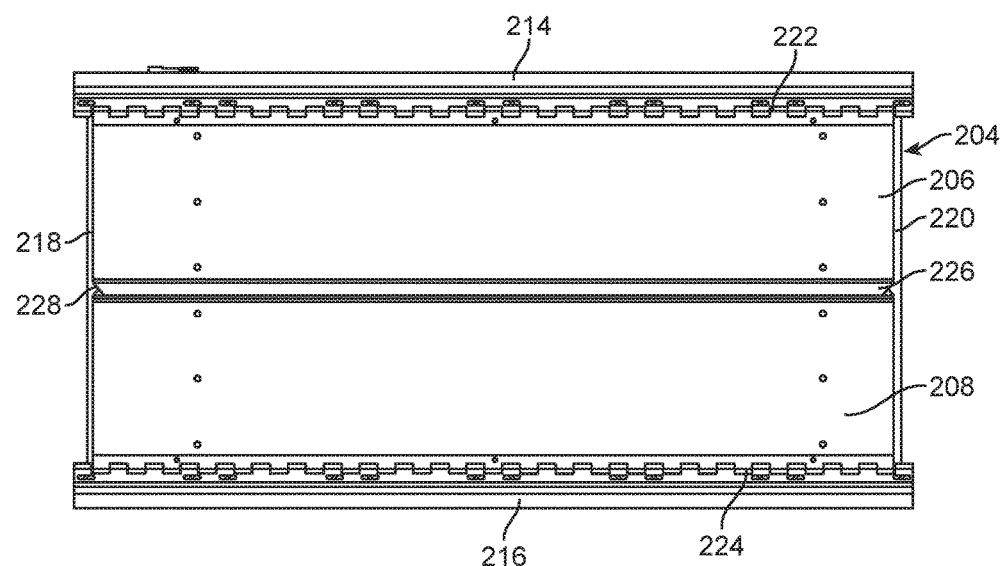
FIG. 4 is a bottom view of the plant shield assembly of FIG. 2.

Referring now to FIGS. 3 and 4, the plant shield assembly 200 includes an elongated shield 204 that includes a first door 206 operably connected to a second door 208. In one form, the elongated shield 204 includes a single door. In another form, the elongated shield 204 includes any number of doors such as first door 206, second door 208, a third door 209, and a fourth door 211. The plant shield assembly 200 also includes a door opening mechanism 210 that is configured to move the first door 206 and the second door 208 or any number of doors from a closed position (illustrated in FIG. 3) to an open position as described in more detail below. The first door 206 and the second door 208 have substantially smooth surfaces 205 and 207, respectively, that are positioned to provide a smooth shield or surface across the bottom of the cotton harvester 100.

The plant shield assembly 200 includes a frame 212 that is mounted to the underside 202 of the cotton harvester 100. In another embodiment, the plant shield assembly 200 is mounted directly to the underside 202 of the cotton harvester. The frame 212 includes a pair of longitudinal members 214 and 216 connected to a pair of transverse members 218 and 220. In the illustrated embodiment, the first door 206 is pivotally or hingedly attached 222 to longitudinal member 214. The second door 208 is pivotally or hingedly attached 224 to longitudinal member 216. In this configuration, the first door 206 and the second door 208 will rotate away from each other when the door opening mechanism 210 moves the first and second doors 206 and 208 from the closed position to the open position. In other embodiments, a single door such as door 209 can be pivotally mounted to the longitudinal member 214 or longitudinal member 216. In this configuration, door 209 will rotate away from the frame 212 when the door opening mechanism 210 moves the door 209. In yet another embodiment, two adjacent frames each include a single door wherein each of the doors is pivotally attached to the longitudinal member that is positioned between the two doors. In this configuration, the two doors will pivot towards the longitudinal member that is positioned between the doors when the doors move from the closed position to the open position.

The first door 206 and the second door 208 each have a length that spans between the pair of transverse members 218 and 220. The first door 206 has a first width and the second door 208 has a second width wherein collectively the first door 206 and the second door 208 span between the pair of longitudinal members 214 and 216. In the illustrated embodiment, the first width is about equal to the second width. In other configurations, either the first width is larger than the second width or the second width is larger than the first width. The first door 206 has a first end portion 226 and the second door 208 has a second end portion 228 that are configured to have an overlapping arrangement when the first door 206 and the second door 208 are in the closed position. As such the first door 206 and the second door 208 are collectively configured to cover the frame 212 and thereby cover a corresponding section of the underside 202 of the cotton harvester 100.

Figure 5:
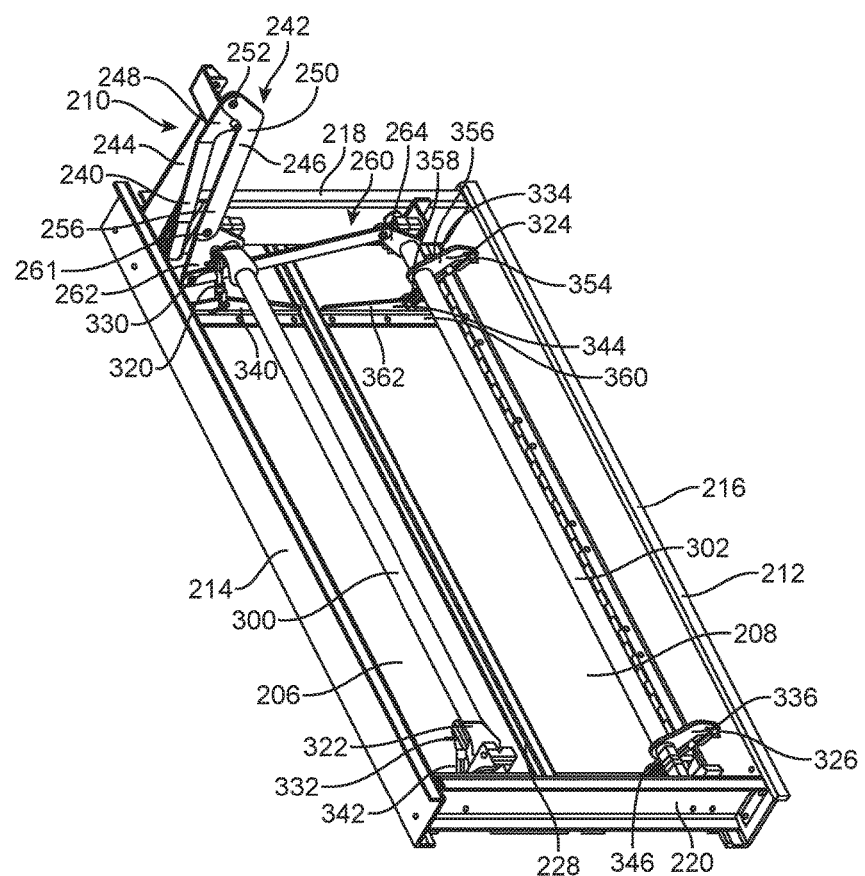
FIG. 5 is a top view of the plant shield assembly of FIG. 2.
Figure 6:
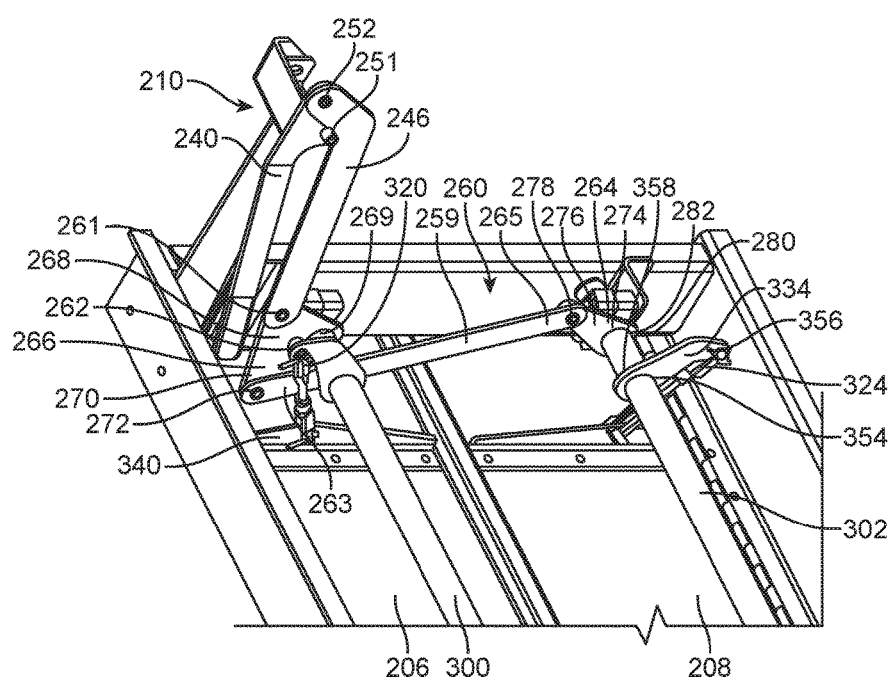
FIG. 6 is a partial top view of the plant shield assembly of FIG. 2.

Referring now to FIGS. 5 and 6, one embodiment of the door opening mechanism 210 is illustrated. In this embodiment, the door opening mechanism 210 includes a handle or lever 240 and an over-center linkage assembly 242 operably connected between the handle 240 and the first door 206 and the second door 208. Alternatively, the door opening mechanism 210 may be a linear actuator that implements pneumatic, hydraulic, or electrical power to open and close the first door 206 and the second door 208. For example, the door opening mechanism 210 can include a hydraulic cylinder, an air cylinder, and/or an electric actuator. The over-center linkage assembly 242 includes a stationary mount 244 and a door link 246. The handle 240 is pivotally connected to the stationary mount 244 at pivot point or connection 251. The handle 240 and the door link 246 include common ends 248 and 250, respectfully, that are pivotally connected to one another at pivot point or connection 252. A distal end 256 of the door link 246 is pivotally connected to a linkage assembly 260 at pivot point 261 to establish a linked connection there between. The handle 240 is configured to rotate about the pivot point 251 to rotate the end 248 of the handle 240 towards the first door 206. As the end 248 of the handle 240 rotates about the stationary mount 244, the pivot point 252 and the door link 246 moves toward the first door 206 and engages a first link set 262 and rotates the first link set 262 about the pivot point 261.

The linkage assembly 260 is operably connected between the door opening mechanism 210, the first door 206, and the second door 208. The linkage assembly 260 is an over-center linkage assembly however in other embodiments the linkage assembly 260 may be configured differently. The linkage assembly 260 includes a main bar link 259 that includes a first end portion 263 opposite a second end portion 265 and a length there between that spans between a first link set 262 and a second link set 264. The linkage assembly 260 includes a first link set 262 operably connected with the first door 206 and a second link set 264 operably connected with the second door 208. The first link set 262 includes a plate or bar 266 having a first end 268 that is pivotally connected at pivot point 261 to the distal end 256 of the door link 246. The plate or bar 266 has a second end 270 that is opposite of the first end 268 wherein the second end 270 is pivotally connected at pivot point 272 to the first end portion 263 of the main bar link 259. The plate or bar 266 has an opening 269 sized to receive a first rock shaft 300 therein. The second link set 264 includes a plate or bar 274 having a first end 276 that is pivotally connected at a pivot point 278 to the second end portion 265 of the main bar link 259. The plate or bar 274 has a second end 280 that is opposite the first end 276 wherein the second end 280 includes an opening 282 sized to receive a second rock shaft 302 therein as described in more detail below.

The plant shield assembly 200 includes a first rock shaft 300 and a second rock shaft 302 that span between the pair of transverse members 218 and 220 of the frame 212. In the illustrated embodiment, the first rock shaft 300 and the second rock shaft 302 are cylindrical in shape however other embodiments may include a different shape. The first rock shaft 300 and the second rock shaft 302 are respectively configured to partially or fully support the first door 206 and the second door 208. The first rock shaft 300 and the second rock shaft 302 are configured to rotate in opposite directions, however in other embodiments the first rock shaft 300 and the second rock shaft 302 can be configured to rotate in the same direction.

The plant shield assembly 200 includes a first adjustable turnbuckle 320 and a second adjustable turnbuckle 322 operably attached to the first door 206 and the first rock shaft 300. The plant shield assembly 200 also includes a third adjustable turnbuckle 324 and a fourth adjustable turnbuckle 326 operably attached to the second door 208 and the second rock shaft 302. All of the adjustable turnbuckles are similar and are commonly known in the industry. In one example, the adjustable turnbuckles consist of a metal coupling device consisting of an oblong piece internally threaded at both ends into which the corresponding sections of two threaded rods are screwed in order to form a unit that can be adjusted for tension or length. Moreover, the adjustable turnbuckles 320, 322, 324, and 326 may be a mechanically adjustable turnbuckle type mechanism or they may be a linear actuator that implements pneumatic, hydraulic, or electrical power to alter the distance between a first end and a second end of the turnbuckles 320, 322, 324, and 326, respectively. Accordingly, this disclosure is not limited to any particular type of adjustable turnbuckle but rather considers many different structures for altering the length of the adjustable turnbuckle. In a different embodiment, the adjustable turnbuckles 320, 322, 324, and 326 may not have adjustable lengths at all.

The adjustable turnbuckles 320, 322, 324, and 326, can be adjusted individually or similarly to each other. The adjustment of the adjustable turnbuckles 320, 322, 324, and 326, enables the first door 206 and the second door 208 to fully close and eliminate any gap between the first and second doors 206 and 208. Moreover, adjustment of the adjustable turnbuckles 320, 322, 324, and 326, can also adjust the tension or amount of force required to open and close the first door 206 and the second door 208. The adjustable turnbuckles 320, 322, 324, and 326, respectively, are attached at a corresponding first end to links 330, 332, 334, and 336, respectively. The links 330, 332, 334, and 336, are all similar therefore only link 334 will be described. Link 334 includes a first end 356 opposite a second end 358 wherein the first end 356 is attached to the first end of the adjustable turnbuckle 324. Link 334 includes a hole 354 sized to receive the second rock shaft 302 therein near the second end 358. The adjustable turnbuckles 320, 322, 324, and 326, respectively, are attached at a corresponding second end to an angle member 340, 342, 344, and 346, respectively. The angle members 340, 342, 344, and 346, are all similar therefore only angle member 344 will be described. Angle member 344 is substantially L-shaped wherein a first leg 360 is disposed in a 90 degree relationship to a second leg 362. The first leg 360 is attached to the second door 208 and the second leg 362 extends away from the second door 208. The second leg 362 is attached to the second end of adjustable turnbuckle 324. Other configurations for angle members 340, 342, 344, and 346, can be used for attachment of the adjustable turnbuckles 320, 322, 324, and 326 with the first and second doors 206 and 208.

Figure 7:
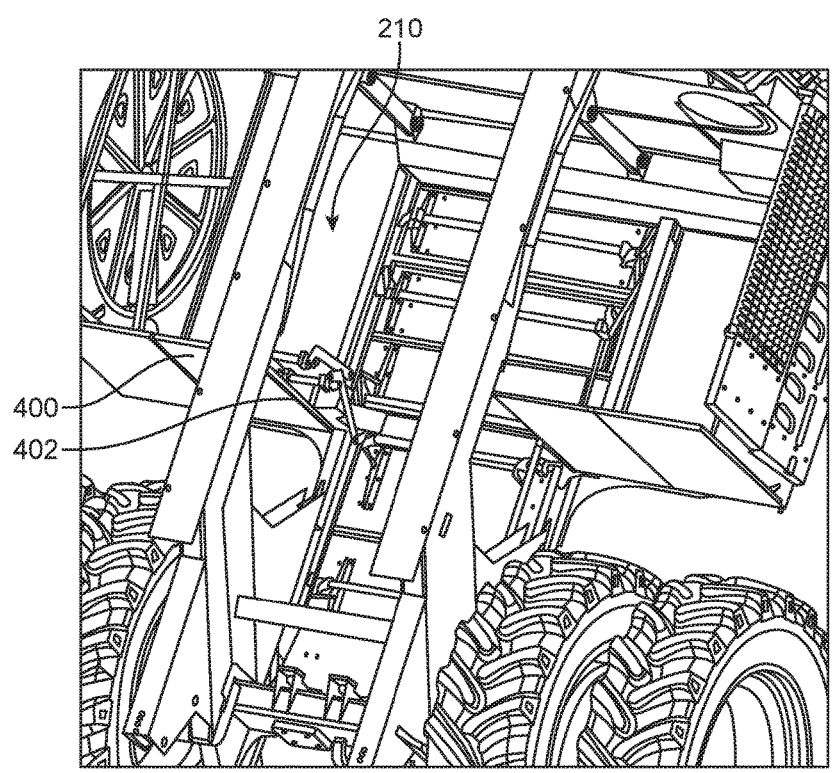
FIG. 7 is a partial bottom view of the plant shield assembly of FIG. 2.

Referring to FIG. 7, an access door 400 is pivotally attached 402 to the cotton harvester 100 and located adjacent the door opening mechanism 210. As such, the door opening mechanism 210 is positioned between the access door 400 and the cotton harvester 100. The access door 400 has a length and a width that covers the door opening mechanism 210 and the access door 400 is mounted to the cotton harvester 100 in such a manner to block operation of the door opening mechanism 210, as described next. The access door 400 is operable between an open position to enable access to the door opening mechanism 210 and a closed position to block operation of the door opening mechanism 210. In FIG. 7, the access door 400 is in the closed position thereby blocking operation and access to the door opening mechanism 210. As discussed above, the door opening mechanism 210 includes the handle or lever 240 which is configured to rotate about the pivot point or connection 252 and thereby form a path of rotation for the handle 240. In the closed position, the access door 400 blocks the handle 240 from movement through this path of rotation. Since the handle 240 is unable to move through the path of rotation while the access door 400 is in the closed position, the elongated shield 204 is closed and will not open thereby containing any dust or debris that may be contained in the elongated shield 204. Moreover, the access door 400 shields the handle 240 from any movement until it is desired by the operator. In one form, the handle 240 and the access door 400 are configured such that the path of rotation of the handle 240 is substantially aligned with the access door 400 in the closed position. In another form, the handle 240 and the access door 400 are configured such that the path of rotation of the handle 240 is substantially perpendicular to the access door 400 in the closed position. In the open position, the access door 400 pivots or rotates away from the cotton harvester 100 and the door opening mechanism 210. When the access door 400 is in the open position, the handle 240 is operable to move through its path of rotation as desired by the operator and thereby open the elongated shield 204. In one form, the access door 400 includes a locking mechanism (not illustrated) that is configured to operate between a locked position and an unlocked position. When the locking mechanism is in the locked position, the access door 400 is in the closed position and unable to pivot to the open position. When the locking mechanism is in the unlocked position, the access door 400 is operable to pivot to the open position as desired by the operator.

In one exemplary embodiment, one technique of operating the plant shield assembly 200 will be described next. The technique includes moving the access door 400 from a closed position to an open position to expose the door opening mechanism 210. In the closed position, the access door 400 blocks operation of the door opening mechanism 210 however when the access door 400 is moved to the open position then the door opening mechanism 210 is operable. Next, the technique includes operating the door opening mechanism 210 located between the elongated shield 204 and the cotton harvester 100 to rotate the handle 240 about pivot point 252. As the handle 240 rotates about the pivot point 251, the end 248 of the handle 240 rotates about the pivot point 251. The door link 246 moves toward the first door 206 and engages a first link set 262 and rotates the first link set 262 about the pivot point 261. As the first link set 262 rotates, the first rock shaft 300 also rotates in a first direction which causes the links 330 and 332 to rotate. As the links 330 and 332 rotate, they force the turnbuckles 320 and 322 to move away from the frame 212 and pivot or open the first door 206 about the pivot connection 222. As the first link set 262 rotates, the main bar link 259 moves towards the second rock shaft 302 and the second link set 264 rotates about the pivot point 278. As the second link set 264 rotates it causes the second rock shaft 302 to also rotate in a direction opposite of the first rock shaft 300. Rotation of the second rock shaft 302 in turn causes the links 334 and 336 to rotate with the second rock shaft 302. As the links 334 and 336 rotate, they force the turnbuckles 324 and 326 to move away from the frame 212 and pivot or open the second door 208 about the pivot connection 224. In an alternative embodiment described below, the rock shafts rotate in the same direction. The first door 206 and the second door 208 have moved from a closed position to an open position.

The handle 240 can be rotated in the opposite direction to move the first door 206 and the second door 208 from the open position to a closed position wherein the operation is reversed. In reversing the operation of the handle 240, the second door 208 will move to a fully closed position slightly ahead of or before the first door 206 moves to a fully closed position. As such, the second door 208 closers slightly faster than the first door 206. In other embodiments, the plant shield assembly 200 can be configured such that the first door 206 closes slightly faster than the second door 208.

The technique can also include adjusting any of the adjustable turnbuckles 320, 322, 324, and 326 operably attached between the door opening mechanism 210 and the first door 206 and the second door 208 to adjust a position of one of the doors relative to the other of the doors. Adjustment of one or more of the turnbuckles 320, 322, 324, and 326 allows the operator to adjust the position of one or both of the doors 206 and 208 such that the doors 206 and 208 can close without a gap or only have a very small gap between them. For example, the first end portion 226 of the first door 206 can be adjusted relative to the second end portion 228 of the second door 208 wherein the first end portion 226 rests against the second end portion 228 when the first door 206 and the second door 208 are in the closed position to eliminate or minimize any gap between the first end portion 226 and the second end portion 228. By eliminating the gap between the first door 206 and the second door 208, the plant shield assembly 200 closes off the engine compartment to keep debris out. Moreover, the arrangement of the first door 206 and the second door 208 is such that frame 212 can deflect as the cotton harvester 100 commences movement or a harvesting process and the first door 206 and the second door 208 stay in a closed position without a gap or space between the first end portion 226 and the second end portion 228.

Figure 8:
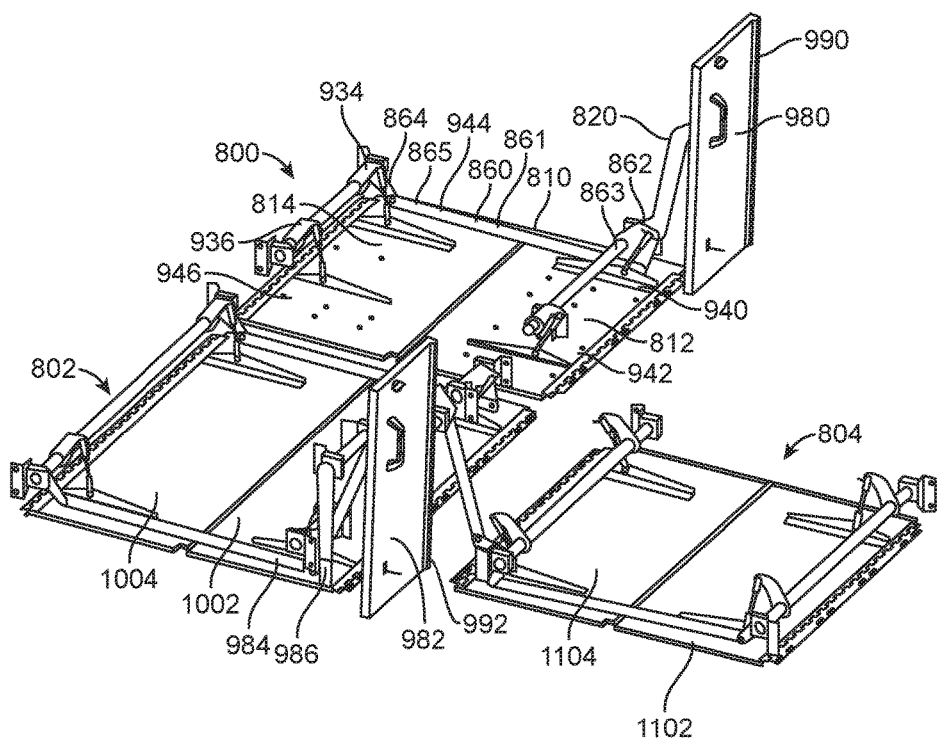
FIG. 8 is a top view of a second embodiment of a plant shield assembly.
Figure 9:
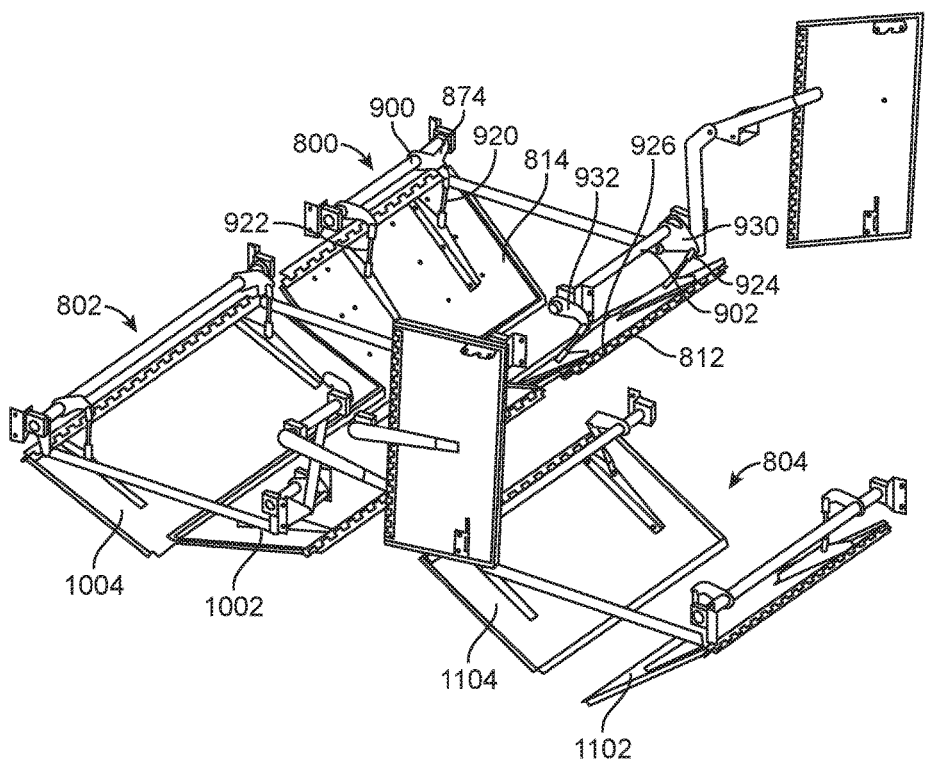
FIG. 9 is a top view of the plant shield assembly of FIG. 8.
Figure 10:
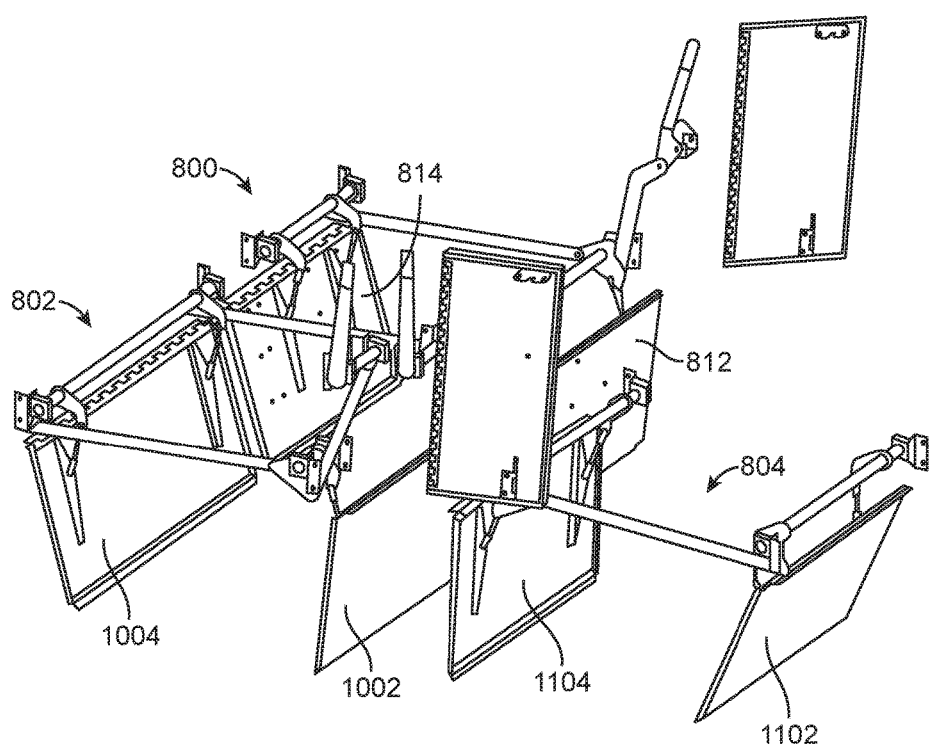
FIG. 10 is a top view of the plant shield assembly of FIG. 8.
Figure 11:
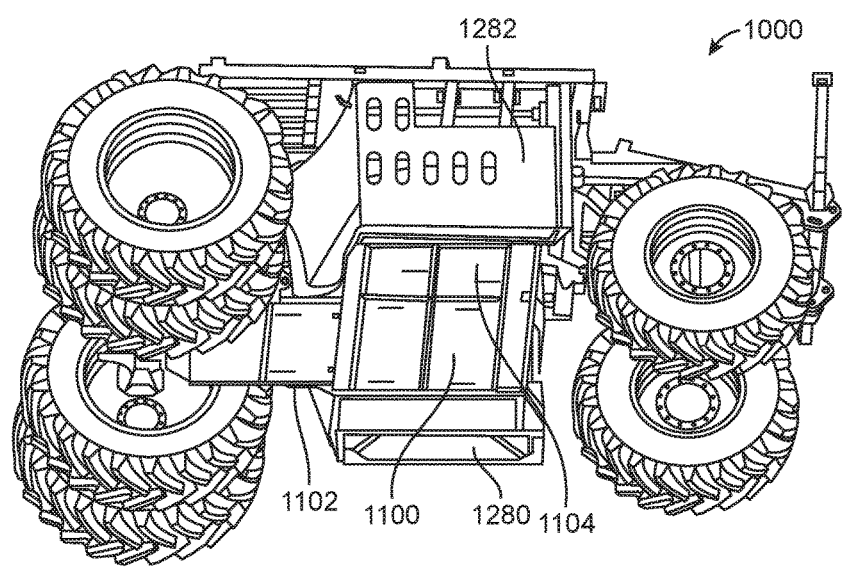
FIG. 11 is a bottom view of a cotton harvester with another embodiment of a plant shield assembly attached thereto.
Figure 12:
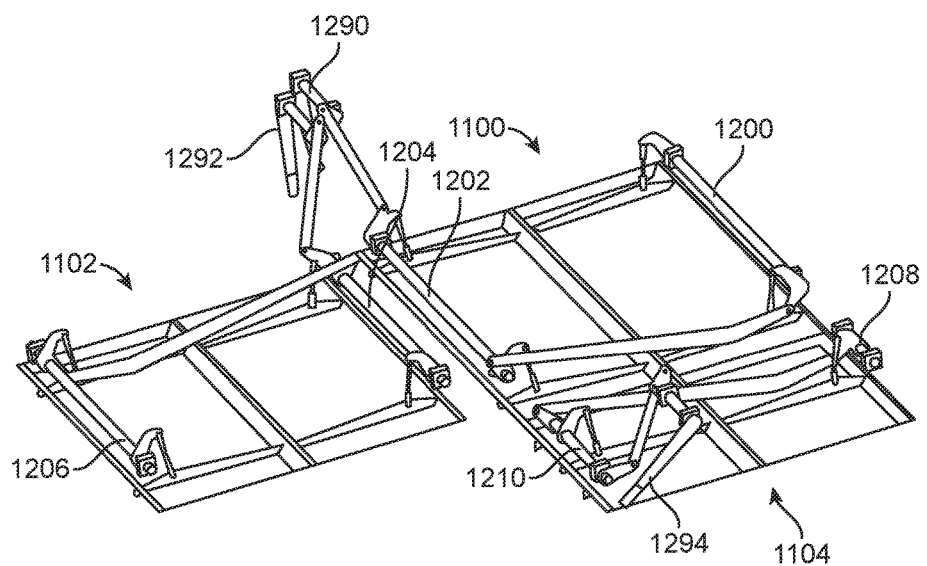
FIG. 12 is a top view of the plant shield assembly of FIG. 11.
Figure 13:
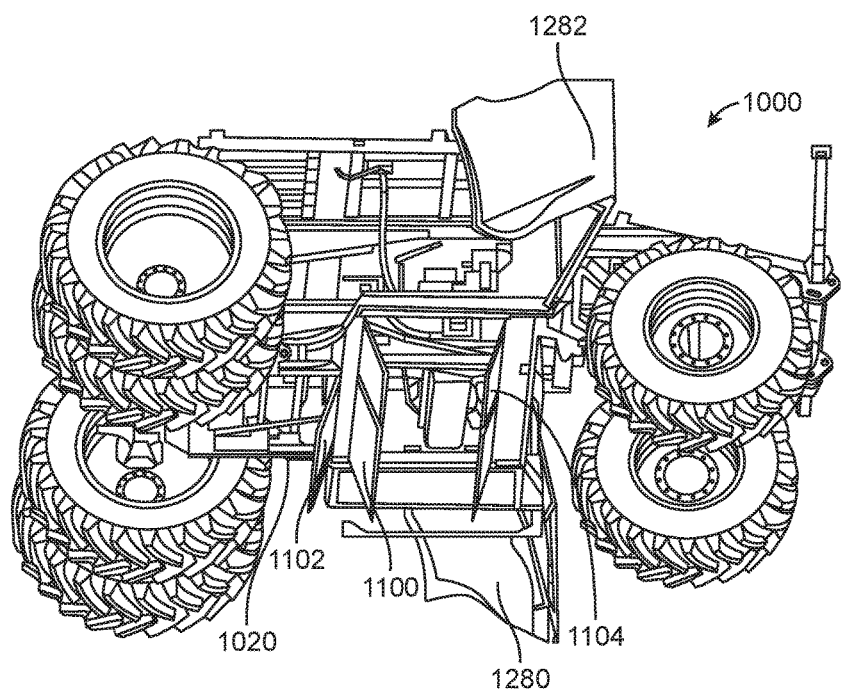
FIG. 13 is a bottom view of the cotton harvester and the plant shield assembly of FIG. 11.
Figure 14:
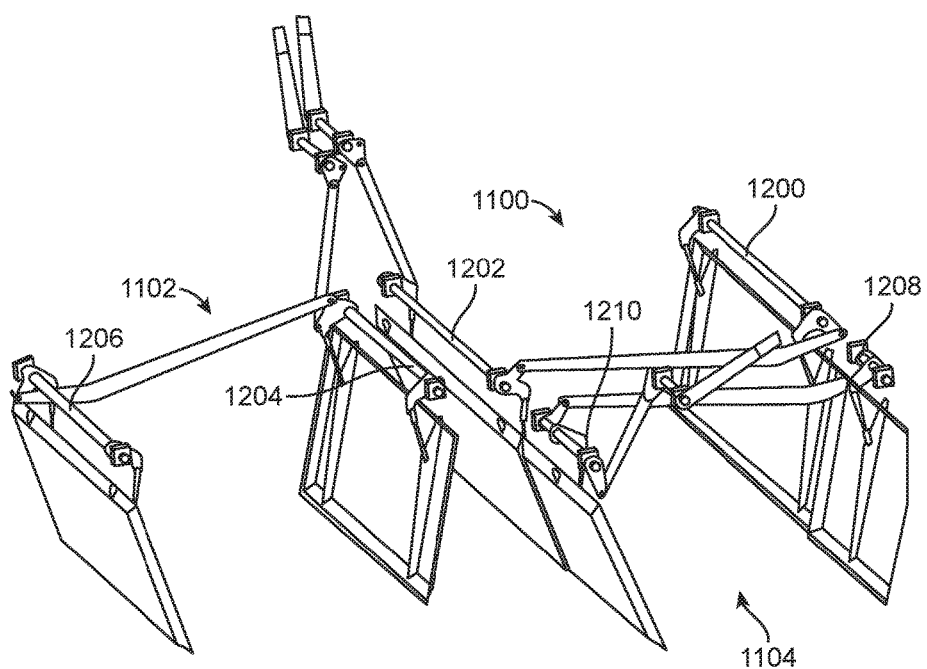
FIG. 14 is a bottom view of the plant shield assembly of FIG. 11.

FIGS. 8, 9, and 10 illustrate a plant shield assembly 800 that is similar to plant shield assembly 200 therefore similar features will not be described again. Also shown are a second plant shield assembly 802 and a third plant shield assembly 804 wherein these plant shield assemblies 802 and 804 are similar to plant shield assembly 800. Plant shield assembly 800, second plant shield assembly 802, and third plant shield assembly 804 are arranged and attached to the underside 202 of the cotton harvester 100 to fully or partially cover and enclose the underside 202 of the cotton harvester 100.

Plant shield assembly 800 includes an elongated shield 810 that includes a first door 812 operably connected to a second door 814. The plant shield assembly 800 includes a door opening mechanism 820 that is configured to move the first door 812 and the second door 814 from a closed position (illustrated in FIG. 8) to a partially open position (illustrated in FIG. 9) to a fully open position (illustrated in FIG. 10). The door opening mechanism 820 is similar to door opening mechanism 210. The first door 812 and the second door 814 are similar to the first door 206 and the second door 208, respectively.

Plant shield assembly 800 includes a frame (not illustrated) that is similar to frame 212 that is mounted to the underside 202 of the cotton harvester 100. Alternatively, the plant shield assembly 800 can be mounted directly to the underside 202 of the cotton harvester 100. The first door 812 and the second door 814 are pivotally or hingedly attached to the frame or alternatively to the underside of the cotton harvester 100.

The plant shield assembly 800 includes a linkage assembly 860 similar to linkage assembly 260, unless noted otherwise. The linkage assembly 860 is operably connected between the door opening mechanism 820, the first door 812, and the second door 814. The linkage assembly 860 is an over-center linkage assembly however in other embodiments the linkage assembly 860 may be configured differently. The linkage assembly 860 includes a main bar link 861 that includes a first end portion 863 opposite a second end portion 865 and a length there between that spans between a first link set 862 and a second link set 864. The linkage assembly 860 includes a first link set 862 operably connected with the first door 812 and a second link set 864 operably connected with the second door 814. The first link set 862 and the second link set 864 are similar to the first link set 262 and the second link set 264, respectively. However, the second link set 864 is rotated between about 30 to about 90 degrees as compared to the orientation and position of the second link set 264. As a result of the different position of the second link set 864, a first rock shaft 900 and a second rock shaft 902 rotate in the same direction. The second link set 864 includes a plate or bar 874 that is positioned in an orientation that is about 30 to about 90 degrees as compared to the orientation and position of the plate or bar 274.

The plant shield assembly 800 includes a first rock shaft 900 and a second rock shaft 902 similar to first rock shaft 300 and second rock shaft 302, respectively. However, first rock shaft 900 and second rock shaft 902 are configured to rotate in the same direction.

The plant shield assembly 800 includes includes a first adjustable turnbuckle 920 and a second adjustable turnbuckle 922 operably attached to the first door 812 and the first rock shaft 900. The plant shield assembly 800 also includes a third adjustable turnbuckle 924 and a fourth adjustable turnbuckle 926 operably attached to the second door 814 and the second rock shaft 902. The turnbuckles 920, 922, 924, and 926 are similar to turnbuckles 320, 322, 324, and 326, respectively. However, the first adjustable turnbuckle 920 and the second adjustable turnbuckle 922 are positioned between the first rock shaft 900 and the second rock shaft 902 as illustrated in FIGS. 8, 9, and 10.

The adjustable turnbuckles 920, 922, 924, and 926, respectively, are attached at a corresponding first end to links 930, 932, 934, and 936, respectively. The links 930, 932, 934, and 936 are similar to links 330, 332, 334, and 336, respectively. However, link 934 and link 936 are rotated between about 30 to about 90 degrees as compared to the orientation and position of the link 334 and link 336, respectively. The adjustable turnbuckles 920, 922, 924, and 926, respectively, are attached at a corresponding second end to an angle member 940, 942, 944, and 946, respectively. Angle members 940, 942, 944, and 946 are similar to angle members 340, 342, 344, and 346, respectively.

Referring to FIG. 8, a first access door 980 is illustrated in a position that covers first door opening mechanism 820 and a second access door 982 that covers a second door opening mechanism 984 and a third door opening mechanism 986. In other embodiments, additional access doors can be attached to the cotton harvester to cover additional door opening mechanisms. The first door opening mechanism 820 is configured to move the first door 812 and the second door 814 from a closed position (illustrated in FIG. 8) to a partially open position (illustrated in FIG. 9) to a fully open position (illustrated in FIG. 10) of the plant shield assembly 800. The second door opening mechanism 984 is configured to move a first door 1002 and a second door 1004 from a closed position (illustrated in FIG. 8) to a partially open position (illustrated in FIG. 9) to a fully open position (illustrated in FIG. 10) of the second plant shield assembly 802. The third door opening mechanism 986 is configured to move a first door 1102 and a second door 1104 from a closed position (illustrated in FIG. 8) to a partially open position (illustrated in FIG. 9) to a fully open position (illustrated in FIG. 10) of the third plant shield assembly 804. Each of the door opening mechanism 820, the second door opening mechanism 984, and the third door opening mechanism 986, includes a handle or lever similar to handle 240 and configured to rotate about a pivot point similar to pivot point or connection 252 described above.

The first access door 980 and the second access door 982 are similar to the access door 400 described above. The first access door 980 and the second access door 982 each have a length and a width that covers the corresponding first, second, and third door opening mechanisms 820, 984, and 986. The first access door 980 and the second access door 982 are mounted to the cotton harvester 100 in such a manner to block operation of the corresponding first, second, and third door opening mechanisms 820, 984, and 986 when the first access door 980 and the second access door 982 are in a closed position. In the closed position, the first access door 980 and the second access door 982 shield the corresponding first, second, and third door opening mechanisms 820, 984, and 986 from any movement until it is desired by the operator. When the first access door 980 and the second access door 982 are in an open position, the first, second, and third door opening mechanisms 820, 984, and 986 are operable and accessible to an operator.

The first access door 980 is pivotally attached 990 to the cotton harvester 100 (not illustrated) and configured to move between a closed and an open position. The second access door 982 is pivotally attached 992 to the cotton harvester 100 (not illustrated) and configured to move between a closed and an open position. The first access door 980 in a closed positioned (illustrated in FIG. 8) is configured to block or limit operation of the door opening mechanism 820. The second access door 982 in a closed positioned (illustrated in FIG. 8) is configured to block or limit operation of the second door opening mechanism 984 and the third door opening mechanism 986. Therefore, none of the door opening mechanism 820, the second door opening mechanism 984, and the third door opening mechanism 986 are operable or accessible when the first access door 980 and the second access door 982 are in closed positions. The first access door 980 and the second access door 982 are independently operable allowing the operator to open and close the door opening mechanism 820, the second door opening mechanism 984, and the third door opening mechanism 986 as desired.

In one form, the first access door 980 and the second access door 982 include one or more locking mechanisms that are configured to operate between a locked position and an unlocked position to enable the first and second access doors 980 and 982 to operate between a locked or closed position and an unlocked or open position.

FIGS. 11, 12, 13, and 14 illustrate a plant shield assembly 1100 that is similar to plant shield assembly 200 therefore similar features will not be described again. Also shown are a second plant shield assembly 1102 and a third plant shield assembly 1104 wherein these plant shield assemblies 1102 and 1104 are similar to plant shield assembly 1100. Plant shield assembly 1100, second plant shield assembly 1102, and third plant shield assembly 1104 are arranged and attached to an underside 202 of the cotton harvester 100 to fully or partially cover and enclose the underside 1020 of the cotton harvester 1000.

The plant shield assembly 1100 includes a first rock shaft 1200 and a second rock shaft 1202 similar to first rock shaft 300 and second rock shaft 302, respectively. The plant shield assembly 1102 includes a first rock shaft 1204 and a second rock shaft 1206 similar to first rock shaft 300 and second rock shaft 302, respectively. The plant shield assembly 1104 includes a first rock shaft 1208 and a second rock shaft 1210 similar to first rock shaft 300 and second rock shaft 302, respectively. The first rock shafts 1200, 1204, and 1208, are configured to rotate in the respective opposite directions as the second rock shafts 1202, 1206, and 1210.

A first access door 1280 is illustrated in a position that covers a first door opening mechanism 1290 and a second door opening mechanism 1292. A second access door 1282 is illustrated in a position that covers a third door opening mechanism 1294. The first access door 1280 and the second access door 1282 are configured to operate between a closed position illustrated in FIG. 11 and an open position illustrated in FIG. 13. When the first access door 1280 and the second access door 1282 are in the open position, the first door opening mechanism 1290, second door opening mechanism 1292, and the third door opening mechanism 1294 are accessible and therefore can be actuated. When the first access door 1280 and the second access door 1282 are in the closed position, the first door opening mechanism 1290, second door opening mechanism 1292, and the third door opening mechanism 1294 are not accessible and are blocked from actuation.

While embodiments incorporating the principles of the present disclosure have been described hereinabove, the present disclosure is not limited to the described embodiments. Instead, this application is intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. A plant shield assembly for a vehicle, the plant shield assembly comprising:
   an elongated shield having a first door and a second door, the first door operably connected to the second door, the first and the second doors pivotally connected to the vehicle and movable between an open position and a closed position;
   a door opening mechanism operably attached to the elongated shield and configured to move the first and the second doors between the open and closed positions, the door opening mechanism located between the elongated shield and the vehicle; and
   a linkage assembly connects the elongated shield with the door opening mechanism, the linkage assembly configured to limit and control the extent of rotation of the first and second doors, the linkage assembly positioned between the elongated shield and the vehicle.

2. The plant shield assembly of claim 1, wherein the linkage assembly includes an over center latch mechanism having a first link set operably connected with the first door and a second link set operably connected with the second door, the first link set configured to rotate in a first direction to open the first door, the second link set configured to rotate in a second direction to open the second door, wherein the first direction is opposite of the second direction.

3. The plant shield assembly of claim 1, wherein the door opening mechanism includes one of a hydraulic cylinder, an air cylinder, or an electric actuator.

4. The plant shield assembly of claim 1, wherein the linkage assembly includes an over center latch mechanism having a first link set operably connected with the first door and a second link set operably connected with the second door, the first link set configured to rotate in a first direction to open the first door, the second link set configured to rotate in a second direction to open the second door, wherein the first direction is the same as the second direction.

5. The plant shield assembly of claim 1, further comprising an access door adjacent the door opening mechanism, the access door configured to be disposed between an open position to enable actuation of the door opening mechanism and a closed position to block actuation of the door opening mechanism.

6. The plant shield assembly of claim 1, further comprising a first adjustable turnbuckle operably attached between the door opening mechanism and the first door, the first adjustable turnbuckle configured to adjust a position of the first door relative to the second door.

7. The plant shield assembly of claim 1, wherein the elongated shield includes a third door operably connected to a fourth door, the third and the fourth doors pivotally connected to the vehicle and operable between an open position and a closed position, the first and the second doors are operably connected to the third and fourth doors such that all of the doors are actuated together.

8. The plant shield assembly of claim 1, further comprising a frame attached to the vehicle, the frame having a pair of longitudinal members connected to a pair of transverse members wherein the elongated shield is attached to the frame.

9. The plant shield assembly of claim 8, wherein the first door is pivotally attached to one of the longitudinal members and the second door is pivotally attached to the other of the longitudinal members such that the first door and the second door rotate away from each other.

10. The plant shield assembly of claim 8, wherein the first door and the second door are pivotally attached to one of the longitudinal members such that the first and the second door pivot towards the one longitudinal member.

11. A plant shield assembly for a vehicle, the plant shield assembly comprising:
- an elongated shield having one or more doors pivotally connected to the vehicle and operable between an open position and a closed position;
- a handle operably attached to the elongated shield and configured to operate the one or more doors between the open position and the closed position, the handle configured to rotate during operation thereof; and
- an access door adjacent the handle, the access door configured to be disposed between an open position to enable actuation of the handle and a closed position to engage and block actuation of the handle.

12. The plant shield assembly of claim 11, wherein the access door is configured to rotate away from the vehicle to enable operation of the handle.

13. The plant shield assembly of claim 11, wherein the access door is configured to cover the handle in the closed position.

14. The plant shield assembly of claim 11, wherein the handle is configured for rotation and has a path of rotation that is substantially perpendicular to the closed position of the access door.

15. The plant shield assembly of claim 11, wherein the handle is located between the elongated shield and the vehicle.

16. The plant shield assembly of claim 11, wherein a first door of the one or more doors includes a first end portion and a second door of the one or more doors includes a second end portion, wherein the first end portion and the second end portion are configured to have an overlapping arrangement when the first and the second doors are in the closed position.

17. The plant shield assembly of claim 11, further comprising a linkage assembly operatively connecting the elongated shield with the handle, the linkage assembly configured to limit and control the extent of rotation of the one or more doors, the linkage assembly positioned between the elongated shield and the vehicle.

* * * * *